US006968406B2

(12) United States Patent　　(10) Patent No.:　　US 6,968,406 B2
Merkin　　(45) Date of Patent:　　Nov. 22, 2005

(54) SYSTEM AND METHOD FOR ARBITRATING ACCESS BETWEEN COMMON ACCESS REQUESTS ON A BUS

(75) Inventor: Cynthia M. Merkin, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 213 days.

(21) Appl. No.: 10/370,004

(22) Filed: Feb. 20, 2003

(65) Prior Publication Data

US 2004/0177187 A1 Sep. 9, 2004

(51) Int. Cl.$^7$ .......................... G06F 13/00; G06F 13/14
(52) U.S. Cl. ..................... 710/107; 710/305
(58) Field of Search ................ 710/107, 311, 710/309, 310, 111, 240, 243, 62, 241, 113, 313, 305; 711/151, 158; 370/462, 412, 416, 431; 712/29, 33; 340/825.5, 825.51; 713/1

(56) References Cited

U.S. PATENT DOCUMENTS 4,736,319 A  *  4/1988  DasGupta et al. .......... 710/110
6,269,467 B1 *  7/2001  Chang et al. .................. 716/1
6,282,583 B1 *  8/2001  Pincus et al. ............... 713/375
6,748,477 B1 *  6/2004  Benson et al. .............. 710/305
6,763,418 B1 *  7/2004  Chou et al. .................. 710/317
6,804,741 B2 * 10/2004  Cowan ....................... 710/311

OTHER PUBLICATIONS

"A VLSI processor–switch for a dual IEEE–796 bus with shared and dual–port memories" by Opsommer, J. and D'Hollander, E.H (abstract only) Publication Date: May 8–12, 1989.*

* cited by examiner

Primary Examiner—Gopal C. Ray
(74) Attorney, Agent, or Firm—Baker Botts L.L.P.

(57) ABSTRACT

A system and method of arbitrating access on a bus includes a bus, a bus expander, a boot module, and a management module. The bus expander includes an access engine, a first bus interface, a second bus interface, and a plurality of general purpose input/output ports. The boot module couples with a first segment of the bus and communicatively couples to the bus expander via the first bus interface. The management module couples with a second bus segment of the bus and communicatively couples with the bus expander via the second bus interface. The boot module and the management module make one or more access requests for one or more devices interfaced with the general purpose input/output ports of the bus expander thereby allowing the modules to communicate with the devices. The access engine arbitrates the access requests made by the modules to prevent bus hang conditions.

11 Claims, 2 Drawing Sheets

SYSTEM AND METHOD FOR ARBITRATING ACCESS BETWEEN COMMON ACCESS REQUESTS ON A BUS

TECHNICAL FIELD

This disclosure relates in general to the field of information handling systems, and more particularly to a system and method for arbitrating access on a bus.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally include one or more buses, such as the Inter-Integrated Circuit ($I^2C$) Bus, the System Management Bus (SMBus) pr an expansion bus, that allow devices and components within the information handling system to communicate with each other. Components such as processors, the BIOS, and firmware utilize the bus in order to access other devices connected to bus, such as sensor devices, in order to determine the status of the information handling system. For instance, the BIOS upon start-up of the information handling system determines if certain devices and components are connected and functioning properly. Also, firmware may request status checks during information handling system operation from devices coupled with the buses in order to determine if any errors have occurred or been detected and to retrieve sensor readings regarding operating temperatures or voltages.

Two important information handling system buses include the Inter-Integrated Circuit ($I^2C$) bus providing a communication link between integrated circuits within the information handling system and the System Management Bus (SMBus) providing a control bus for system and power management related tasks. Both the $I^2C$ bus and the SMBus are seven bit addressable buses that utilize a multimaster protocol allowing for multiple devices to be connected to the bus where each one of the devices can act as master of the bus by initiating a data transfer. Because there is a limit to the number of devices that can be associated with a single bus segment, access to devices such as sensors and status registers is multiplexed so that access may be granted to all segments of the buses.

Generally in information handling systems, general purpose bus status information is desired by two different components at the same time. For instance, both the BIOS and firmware may desire the types of errors that have been detected by particular devices or sensors and therefore make simultaneous requests to the same device on the bus. Complicating such simultaneous requests is the multiplex and multimaster characteristics of the $I^2C$ bus and the SMBus. The multiplexed configuration is not compatible with the multimaster configuration when two devices request the same status information because each bus master, here the BIOS and the firmware, can switch in during the middle of a transaction resulting in bus hang conditions. For example, both the BIOS and the firmware request status information from the same sensor device. The BIOS contacts the sensor device via the bus and initiates a data transfer to the sensor device thereby becoming the master of the bus. While the BIOS is communicating with the sensor device, the firmware also initiates a data transfer to the same sensor device attempting to become the master of the bus while the BIOS is currently the master which interrupts the data transfer between the BIOS and the sensor device and creates bus hang conditions where neither the BIOS or the firmware can complete the data transfer and obtain the desired status information.

SUMMARY

Therefore, a need has arisen for a system and method that arbitrates access on a bus to one or more devices while preventing bus hang conditions.

In accordance with the teachings of the present disclosure, a system and method are described which substantially eliminate or reduce disadvantages with previous systems and methods for arbitrating access on a bus. A bus expander including two bus interfaces and a plurality of general purpose input/output ports allows for a bus master for each bus segment and arbitrated access to common devices without bus hang conditions when more than one bus master requests access to a common device.

In accordance with one aspect of the present disclosure, an information handling system is provided. The information handling system includes at least one bi-directional bus and a bus expander associated with the bus. The bus expander includes a first bus interface, a second bus interface, and a plurality of general purpose input/output (GPIO) ports. A boot module couples to a first bus segment and communicatively couples to the bus expander via the first bus interface. A management module couples to a second bus segment and communicatively couples to the bus expander via the second bus interface. The bus expander further includes an access engine that arbitrates between one or more common access requests from the boot module and the management module.

More specifically in one embodiment, one or more devices couple to the GPIO ports of the bus expander. The bus expander includes a register that stores one or more associations between the devices and the GPIO ports. The bus expander further includes a first unique address for the first bus interface with respect to the first bus segment and a second unique address for the second bus interface with respect to the second bus segment. The boot module and the management module access the devices through the bus interfaces and bus expander. When the boot module and the management module request access from the same device, the access engine determines the order in which the boot module and the management module access the device in order to prevent bus hang conditions.

The present disclosure provides a number of important technical advantages. One important technical advantage is the ability to arbitrate access on a bus to one or more devices while preventing bus hang conditions. Instead of directly accessing devices connected to the bus, bus masters, such as the boot module and the management module, access the devices through the bus expander where the access engine does not allow the bus masters to attempt to access the same device at the same time. For instance, if the boot module desires to request status information from a sensor device, the boot module goes through the bus expander to access the sensor device. If while the boot module is communicating with the sensor device the management module also requests access to the same sensor device, the bus expander and access engine recognize that the boot module is currently communicating with the sensor device and do not communicatively couple the management module with sensor device until the boot module finishes communicating with it. Therefore, no bus hang conditions occur because the boot module and the management module do not access the same device at the same time. Furthermore, if both the boot module and the management module simultaneously request access to the same device, the access engine determines an order for the access requests preventing the boot module and the management module attempting to access the same device at the same time and any bus hang conditions. In addition, the bus expander allows each bus segment to have a single bus master which further reduces the likelihood of occurrence for bus hang conditions.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to the figures, wherein like numbers are used to indicate like and corresponding parts.

Previous systems and methods for arbitrating access on a bus to devices have been designed without taking into account the multimaster and multiplex characteristics of information handling system buses. For instance, Amtel manufactures a dual interface bus component that provides I$^2$C bus access at one interface and RFID (radio frequency identification) access at the other interface while both Intel and ServerWorks provide bus components that provide status access via a direct input/output port for the BIOS and via an I$^2$C interface for the firmware. Furthermore, other systems implement a firmware delay at start up for common devices which allows the BIOS to access the status information before the firmware requests access to the same status information. But these systems do not typically reduce the likelihood of bus hang conditions while providing bus interfaces and GPIO interfaces. The present disclosure allows for a system and method for arbitrating access on a bus to devices that allows for arbitrated access for simultaneous or common access requests thereby reducing the likelihood of bus hang conditions.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
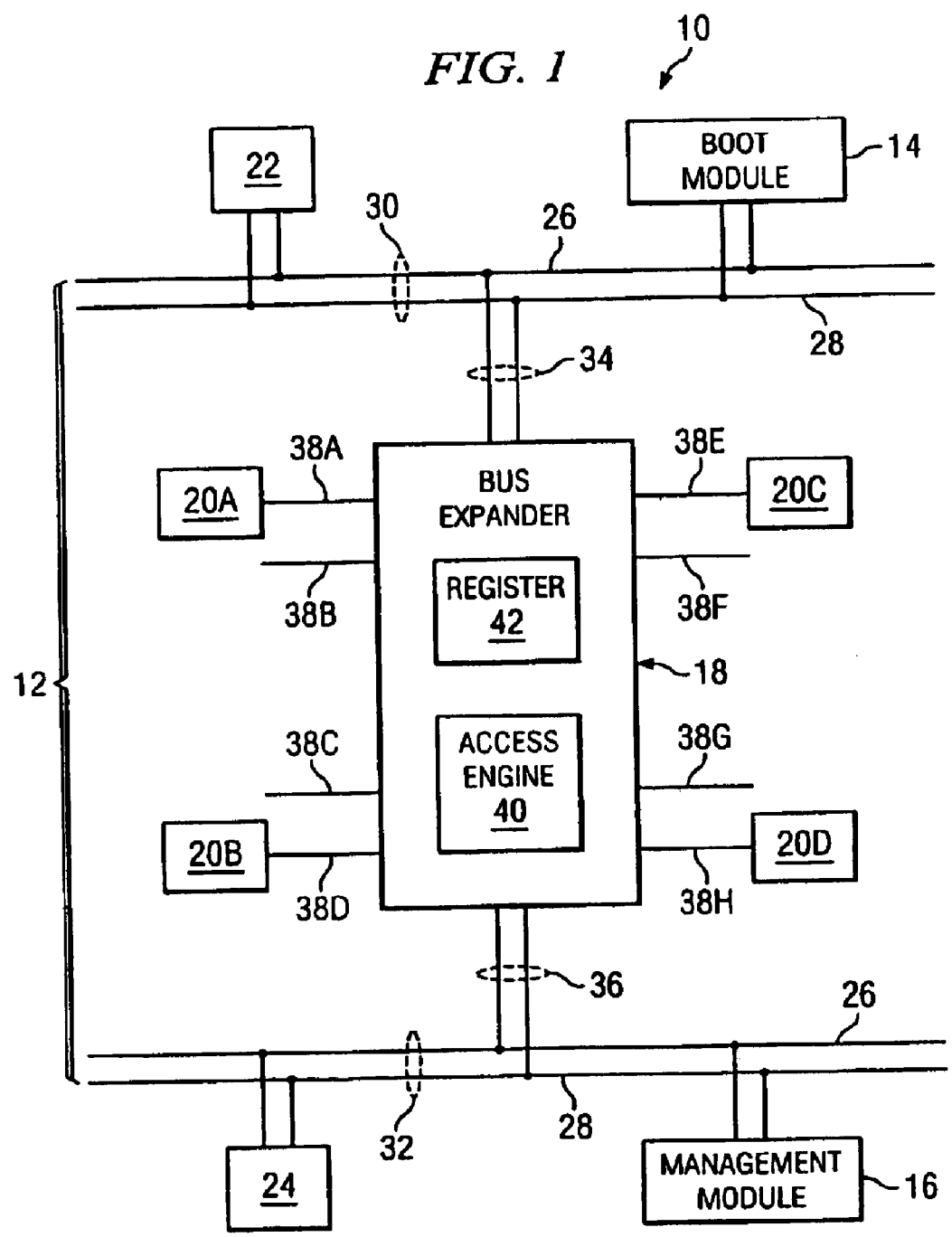
FIG. 1 illustrates a block diagram of an example information handling system.

FIG. 1 illustrates a block diagram of information handling system 10. Information handling system 10 includes bus 12, boot module 14, management module 16, bus expander 18, and devices 20, 22, and 24. In the embodiment shown in FIG. 1, bus 12 is a bi-directional, two-wire I$^2$C bus but in alternate embodiments bus 12 may be an SMBus or any other appropriate type of information handling system bus. Bus 12 provides a communication link between integrated circuits utilizing two bus lines—serial data line (SDA) 26 and serial clock line (SCL) 28. SDA 26 and SCL 28 carry information between boot module 14, management module 16, and devices 20, 22, and 24 connected to bus 12. SDA 26 transmits start, address, data, control, acknowledge, and stop information while SCL 28 carries the clock. Bus 12 is typically used as a control, diagnostic, and power management bus with interconnects and transfers of information between various integrated circuits or chips in information handling system 10.

As stated above, bus 12 may also be an SMBus which is a bi-directional, two-wire bus that is based on the principles of operation of the I$^2$C bus and utilizes the I$^2$C bus as its backbone. The SMBus provides a control bus for system and power management related tasks. The SMBus and the I$^2$C bus are compatible with each other and devices such as devices 20, 22, and 24 are freely interchangeable between the buses in embodiments where information handling system 10 includes more than one bi-directional bus.

Bus 12 is a multimaster bus allowing for more than one component to be bus master. A bus master is a device that intimates a data transfer, generates clock signals, and terminates a data transfer. Typically a bus master initiates a bus or data transfer between it and a single bus slave (a device also coupled to bus 12) and provides clock signals. Both boot module 14 and management module 16 may act as bus masters. Because only one component can master bus 12 at one time and in order to account for the possibility of more than one bus master, bus 12 is divided into two bus segments with each bus segment having a single bus master. Boot module 14 is the bus master or owner of first bus segment 30 and management module 16 is the bus master or owner of second bus segment 32. Boot module 14 may be the BIOS (basic input/output system) and is therefore made accessible to bus 12 on an erasable programmable read-only memory (EPROM) chip. Management module 16 may be firmware, an embedded server manager, or any other appropriate type of system manager.

In addition to bus masters, bus 12 also includes one or more bus slaves. Bus slaves are devices addressed by the bus masters, receive data provided by the bus master, and provide data to the bus master. In the embodiment shown in FIG. 1, bus 12 includes devices 20, 22, and 24 which operate as bus slaves and are communicatively coupled to bus 12 in addition to boot module 14 and management module 16. Devices 20 are devices that both boot module 14 and management module 16 are interested in receiving status information from. Devices 20, 22, and 24 may be memory devices, sensor devices, microcontrollers, drivers, KVM (keyboard, video, and memory) interfaces, or any other appropriate type of device that provides information regarding the operation of information handling system 10. Devices 20a, 20b, 20c, and 20d connect with bus 12 via bus expander 18 while device 22 directly connects to first bus segment 30 of bus 12 and device 24 directly connects to second bus segment 32 of bus 12. In alternative embodiments, information handling system 10 may include more or less than four devices 20, more than one device 22 connecting to first bus segment 30, and more than one device 24 connecting to second bus segment 32. Furthermore, devices 20 may interface with both bus expander 18 and bus 12 in alternate embodiments.

Bus expander 18 is disposed between and interfaces with first bus segment 30 and second bus segment 32 of bus 12. Bus expander includes two bus interfaces—first bus interface 34 and second bus interface 36. First bus interface 34 couples with first bus segment 30 and allows boot module 14 to communicate with bus expander 18 while second bus interface 36 couples with second bus segment 32 and allows management module 16 to communicate with bus expander 18. Bus expander 18 further includes eight general purpose input/output (GPIO) ports 38a–38h that interface with devices 20. Device 20a interfaces with GPIO port 38a, device 20b interfaces with GPIO port 38d, device 20c interfaces with GPIO port 38e, and device 20d interfaces with GPIO port 38h. GPIO ports 38 allow boot module 14 and management module 16 to interface with devices 20 through bus expander 18. In alternate embodiments, bus expander 18 may include more than eight or less than eight GPIO ports.

Bus expander 18 also includes access engine 40 and register 42. Each of GPIO ports 38 are associated with register 42 so that bus expander 18 can determine which devices 20 interface with which GPIO ports 38. GPIO ports 38 are customizable so that the associations between devices 20 and GPIO ports 38 may be modified. The associations and modifications are stored in register 42 which ensures that when boot module 14 or management module 16 request access to one of devices 20, bus expander 18 correctly connects them with the requested device 20. Register 42 may further include file configurations such as, "zero equal input and one equals output" so that bus expander 18 can recognize whether it is receiving or providing information. Access engine 40 arbitrates access to devices 20 when boot module 14 and management module 16 are interested in communicating with one of devices 20 and includes instructions regarding how to process more than one common access request which is described below in greater detail.

Each of devices 20, 22, and 24, boot module 14, management module 16, and bus expander 18 connected to bus 12 are software addressable and recognized by a unique address. In addition, bus expander 18 includes two unique addresses—a unique address for first bus interface 34 and a unique address for second bus interface 36. For instance, first bus interface 34 may have a unique address of 39h while second bus interface 36 may have a unique address of 45h.

To first bus segment 30, it appears as though there is a device located at 39h while for second bus segment 32 there appears to be a device located at 45h and neither bus segments 30 and 32, boot module 14, or management module 16 know that the device located at 39h and 45h is the same device.

Figure 2:
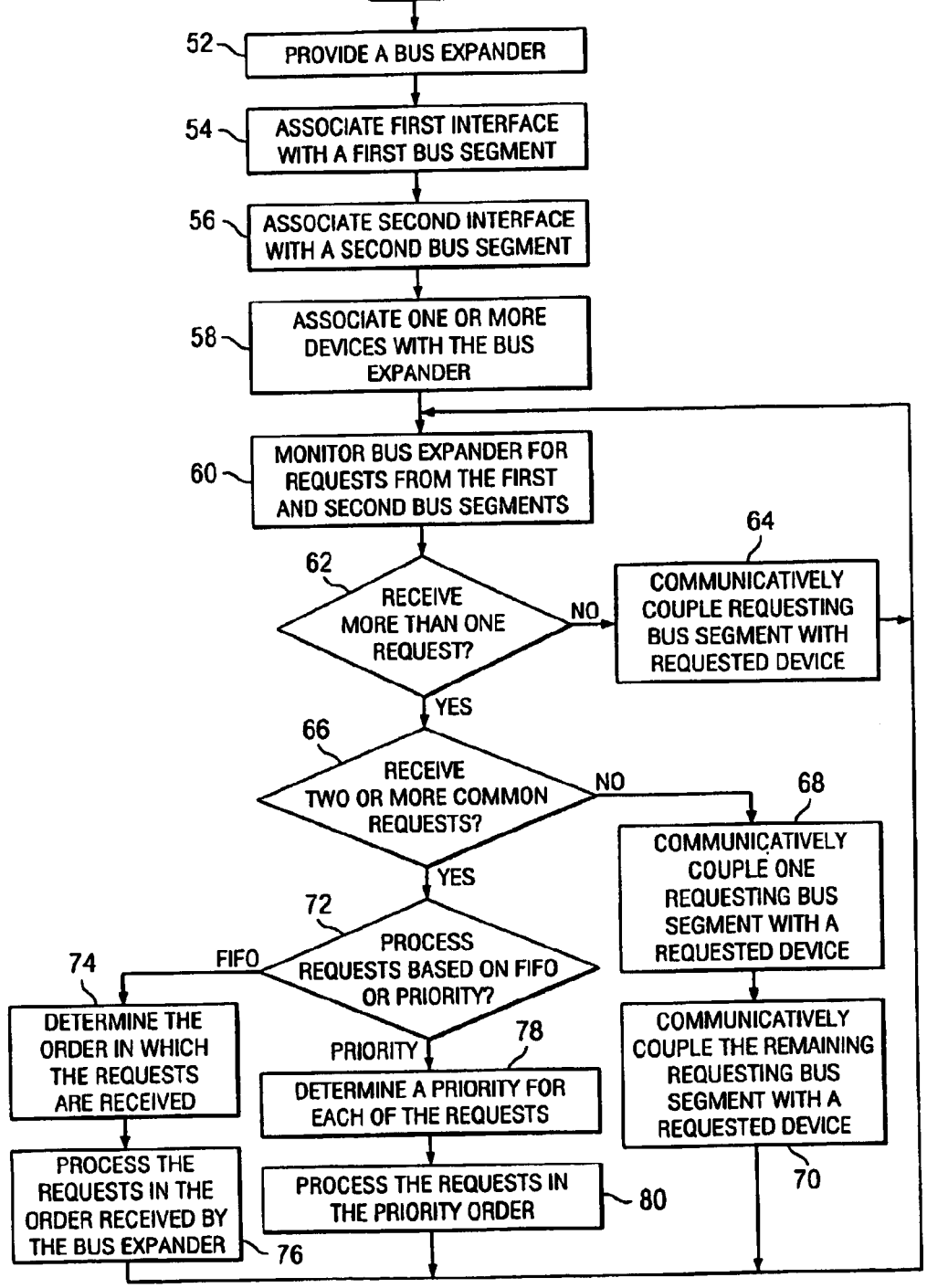
FIG. 2 illustrates a flow diagram of an example method for arbitrating access on a bus to one or more devices.

FIG. 2 illustrates a flow diagram of an example method for arbitrating access on a bus to one or more devices. The method begins at step 50 and at step 52 bus expander 18 is provided for bus 12. At step 54, first bus interface 34 is associated with first bus segment 30 of bus 12 and at step 56 second bus interface 36 is associated with second bus segment 32 of bus 12. Bus interfaces 34 and 36 are associated with bus segments 30 and 32 so that boot module 14 and management module 16 may interface and communicate with bus expander 18. Once bus interfaces 34 and 36 have been coupled with bus segments 30 and 32, at step 58 GPIO ports 38 of bus expander 18 are associated with devices 20 allowing bus expander 18 to communicate with devices 20 where devices 20 are such devices that both boot module 14 and management module 16 are interested in status information.

After devices 20 and bus segments 30 and 32 are properly coupled to bus expander 18, bus expander 18 begins to monitor first bus segment 30 for access requests from boot module 14 and second bus segment 32 for access requests from management module 16. For example, if boot module 14 desires to communicate with device 20b, boot module 14 sends a signal along bus 12 and first bus segment 30 requesting access and information from device 20b. Bus expander 18 recognizes that boot module 14 must access device 20b through bus expander 18 and therefore receives the signal from boot module 14. Likewise, management module 16 may desire to communicate with device 20c and therefore sends a signal along bus 12 and second bus segment 32. Bus expander 18 recognizes that device 20c is associated with bus expander 18 via GPIO port 38e and therefore receives the signal from management module 16. Furthermore, if boot module 14 requests information from device 20b, when device 20b provides the requested information, the requested information travels as a signal along bus 12 and first bus segment 30 through bus expander 18 to boot module 14.

While monitoring bus interfaces 30 and 32 for access requests, bus expander 18 may receive an access request from both boot module 14 and management module 16 at the same time. Access engine 40 of bus expander 18 arbitrates the access requests from boot module 14 and management module 16. For instance, boot module 14 may request status information from device 20a while management module 16 may request status information from device 20d. Bus expander 18 and access engine 40 may also receive common access requests from both boot module 14 and management module 16. A common access request is a request by both bus masters of bus 12, here boot module 14 and management module 16, for status information from the same or common device. For example, both boot module 14 and management module 16 may request status information from device 20c at the same time. Another type of common access request occurs when either boot module 14 or management module 16 is currently communicating with one of devices 20 and the module not currently communicating desires to communicate with that same device 20. For example, management module 16 may be communicating with device 20a and while management module 16 is communicating with device 20a, boot module 14 makes an access request to communicate with device 20a.

When monitoring bus interfaces 34 and 36 and bus segments 30 and 32 for access requests, bus expander 18 may receive one or more than one access requests. At step 62 bus expander 18 determines if it receives one or more than one access request. If at step 62 bus expander 18 receives only one access request, such as a request from boot module 14 to communicate with device 20a, then at step 64 bus expander 18 communicatively couples the requesting or bus master device, here boot module 14, with the requested or bus slave device, here device 20a until boot module 14 completes communicating with device 20a. The process then returns to step 60 where bus expander 18 continues to monitor bus 12 and bus segments 30 and 32 for access requests.

If at step 62 bus expander 18 receives more than one access request, then at step 66 bus expander 18 determines if the two or more access requests are common requests. If the two or more access requests are not common requests, then at step 68 bus expander 18 communicatively couples one of the requesting bus segments and associated bus master with the requested device and at step 70 communicatively couples the other requesting bus segment and associated bus master with the requested device. For instance, boot module 14 requests access to device 20a and management module 16 requests access to device 20b. At step 66 bus expander 18 determines that the two access requests are not common requests and therefore at steps 68 and 70 communicatively couples boot module 14 with device 20a and management module 16 with device 20b. Because management module 16 and boot module 14 are not making common access requests, bus expander 18 has the option of connecting boot module 14 and management module 16 simultaneously to their respective requested devices or connecting them one at a time.

If the two or more access requests received are common access requests at step 66, then at step 72 access engine 40 of bus expander 18 arbitrates and processes the common access requests in order to prevent bus hang conditions. A common access request occurs when both boot module 14 and management module 16 request access to the same device 20 at the same time or while one module is currently communicating with the requested device 20. For instance, boot module 14 and management module 16 may both request access to device 20d at the same time or while one of boot module 14 or management module 16 is currently communicating with device 20d. Two processing arbitration methods are shown in the embodiment of FIG. 2 and include first in, first out (FIFO) arbitration and priority arbitration while alternative embodiments may include different arbitration methods.

If at step 72 access engine 40 arbitrates common access requests on a FIFO basis, then at step 74 access engine 40 and bus expander 18 determine the order in which bus expander 18 received the access requests and at step 76 process the access requests in the order that bus expander 18 received the access requests so that the first access request received is the first access request processed. For example, if both boot module 14 and management module 16 request access to device 20c one right after the other with the boot module 14 request access first, bus expander 18 and access engine 40 communicatively couple boot module 14 with device 20c and management module 16 remains on hold until boot module 14 finishes communicating with device 20c. Once boot module 14 finishes communicating with device 20c, bus expander 18 removes management module 16 from hold and communicatively couples device 20c with management module 16. If boot module 14 is currently communicating with device 20c when management module 16 requests access to device 20c, bus expander 18 places management module 16 on hold until boot module 14 completes communicating with device 20c and them communicatively couples device 20c with management module 16. Once bus expander 18 completes arbitrating all the common access requests, the process returns to step 60 where bus expander 18 continues to monitor for access requests.

If at step 72 access engine 40 and bus expander 18 arbitrate the common access requests based on a priority basis, the access requests having the highest priority are processed first. At step 78 access engine 40 and bus expander 18 determine the priority for the common access requests received by bus expander 18 and at step 80 arbitrate the common access requests in priority order from highest to lowest priority. For example, both boot module 14 and management module 16 may request access to device 20a at the same time where boot module 14 needs the status information from device 20a in order to complete the start-up of information handling system 10 and management module 16 needs the status information because management module 16 logs the status information upon start-up. Management module 16 gaining access to device 20a before boot module 14 results in a longer boot time and possible boot errors because boot module 14 requires the status information to complete start-up. Therefore, boot module 14 has a higher priority than management module 16 to the status information in device 20a and bus expander 18 and access engine 40 process the access request from boot module 14 before processing the access request from management module 16. Management module 16 remains on hold while bus expander 18 processes boot module's 14 access request. Once both common access requests have been processed, the method returns to step 60 where bus expander 18 continue to monitor bus 12 for access requests.

Although the arbitration processing has been described with respect to FIFO arbitration and priority arbitration in FIG. 2, alternative embodiments may include any appropriate method of arbitration between two or more common access requests. Furthermore, the present disclosure may be utilized with respect to information handling systems such as personal computers, servers, portable computers, person digital assistants, or any other appropriate type of information handling.

Although the disclosed embodiments have been described in detail, it should be understood that various changes, substitutions and alterations can be made to the embodiments without departing from their spirit and scope. For example, while the embodiment disclosed herein refers primarily to an I²C bus, it is within the scope of the present disclosure to use an SMBus or any other appropriate bus type.

What is claimed is:

1. An information handling system comprising:
   at least one bi-directional bus;
   a bus expander associated with the bus, the bus expander including an access engine, a first bus interface, a second bus interface, and a plurality of general purpose input/output ports;
   a boot module operably coupled to a first segment of the bus, the boot module operable to communicatively couple to the bus expander via the first bus interface;
   a management module operably coupled to a second segment of the bus, the management module operable to communicatively couple to the bus expander via the second bus interface; and the access engine operable to arbitrate between one or more common access requests from the boot module and the management module.

2. The information handling system of claim 1 wherein the bi-directional bus comprises an I²C bus.

3. The information handling system of claim 1 wherein the bi-directional bus comprises a system management bus.

4. The information handling system of claim 1 further comprising one or more devices operable to couple to the one or more general purpose input/output ports of the bus expander.

5. The information handling system of claim 1 further comprising the bus expander including a register, the register operable to store one or more associations between the general purpose input/output ports and one or more devices.

6. The information handling system of claim 1 furthering comprising the access engine arbitrating the common access requests on a first in, first out basis.

7. The information handling system of claim 1 furthering comprising the access engine operable to rank the common access requests from the boot module and the management module and arbitrate the common access requests based on the ranking.

8. A bus expander comprising:
    a first bus interface;
    a second bus interface;
    a plurality of general purpose input/output ports operable to communicatively couple to an associated boot module and an associated management module;
    a register operable to store one or more associations between the general purpose input/output ports and the associated boot module and the associated management module; and
    an access engine operable to arbitrate between one or more common access requests received by the bus expander from the associated boot module and the associated management module.

9. The bus expander of claim 8 further comprising:
    a first unique address associated with the first bus interface; and
    a second unique address associated with the second bus interface.

10. The bus expander of claim 8 furthering comprising the access engine arbitrating the requests on a first in, first out basis.

11. The bus expander of claim 8 further comprising the access engine operable to rank the common access requests received by the bus expander based on a priority basis and arbitrate the common access requests based on the ranking.

* * * * *